(12) United States Patent
Yang et al.

(10) Patent No.: US 9,881,273 B2
(45) Date of Patent: Jan. 30, 2018

(54) AUTOMATIC OBJECT DETECTION AND STATE ESTIMATION VIA ELECTRONIC EMISSIONS SENSING

(71) Applicant: DISNEY ENTERPRISES, INC., Burbank, CA (US)

(72) Inventors: Chouchang Yang, Pittsburgh, PA (US); Gierad Laput, Pittsburgh, PA (US); Robert Xiao, Pittsburgh, PA (US); Christopher Harrison, Pittsburgh, PA (US); Alanson Sample, Pittsburgh, PA (US)

(73) Assignees: DISNEY INTERPRISES, INC., Burbank, CA (US); CARNEGIE MELLON UNIVERSITY, Pittsburgh, PA (US)

( * ) Notice: Subject to any disclaimer, the term of this patent is extended or adjusted under 35 U.S.C. 154(b) by 58 days.

(21) Appl. No.: 14/925,697

(22) Filed: Oct. 28, 2015

(65) Prior Publication Data

US 2017/0124816 A1    May 4, 2017

(51) Int. Cl.
*G08B 1/08*    (2006.01)
*G06Q 10/08*    (2012.01)
*G06K 7/00*    (2006.01)
*H04M 1/725*    (2006.01)

(52) U.S. Cl.
CPC .......... *G06Q 10/0833* (2013.01); *G06K 7/00* (2013.01); *H04M 1/725* (2013.01)

(58) Field of Classification Search
CPC ............................. G06Q 10/0833; G06K 7/00
USPC ............ 340/506, 3.1, 539.1, 539.11, 539.13, 340/573.1
See application file for complete search history.

(56) References Cited

U.S. PATENT DOCUMENTS

2002/0082809 A1*   6/2002   Kanevsky .............. G06Q 10/06 702/188

* cited by examiner

*Primary Examiner* — Daryl Pope
(74) *Attorney, Agent, or Firm* — Robert G. Crouch; Marsh Fischmann & Breyfogle LLP

(57) ABSTRACT

An object recognition device that senses electrical signals conducted by the body of a human user (e.g., as a result of direct contact with or close proximity to a device emitting or conducting electromagnetic noise), compares the sensed electrical signals to a plurality of signatures of electrical signals produced by a corresponding plurality of types of electrical and electromechanical devices to determine the type of electrical or electromechanical device that generated the electrical signals sensed by the sensor, and communicates information to the human user related to or triggered by the electrical or electromechanical device.

23 Claims, 8 Drawing Sheets

AUTOMATIC OBJECT DETECTION AND STATE ESTIMATION VIA ELECTRONIC EMISSIONS SENSING

BACKGROUND

For years, intelligent systems have promised to improve people's lives by inferring context and activities in diverse environments. In particular, people's interactions with objects offer rich, contextual information closely reflecting one's immediate environment and activity. Yet practical detection and recognition of object interactions has remained an elusive research goal. For example, although RFID systems can provide object recognition capabilities, the use of such systems requires all desired objects to be physically tagged with an RFID tag and, further, it is unknown if users are simply nearby or truly touching an object.

Electronic devices, especially those driven by motors (e.g., power drills) or switching power supplies (e.g., LCD screens), produce significant levels of electromagnetic noise. These unwanted signals propagate as radio frequency (RF) waves and can disrupt nearby devices operating with similar frequency bands. Beginning in the late 1970s, the US Federal Communications Commission (FCC) chartered mandates to regulate the susceptibility of consumer devices to EM noise. These were also established to prevent EM noise from interfering with other electronics, utilities, and purposeful broadcasts, such as TV and radio.

Infrastructures and environments also produce EM noise. For example, AC electricity and devices connected to power lines contribute to the majority of electrical noise at home. In general, EM noise propagates through conduction over circuits and power lines (1 kHz-30 MHz) or through radiation in free space (30 MHz to 10 GHz). Most EM noise sources in the home can be categorized as resistive (e.g., incandescent bulbs), inductive (e.g., brushed DC motors), or switching (generally solid state, e.g., most modern electronic devices).

Additionally, a few classes of non-electromechanical objects can have unique EM signatures. Most notable among these are large, conductive objects, such as structural members in buildings, doors, ladders, furniture, and window frame-work. These are sufficiently large that they act as antennas, capturing energy radiated by proximate noisy devices and wiring. The amalgamation of these signals, in our experiences, is fairly unique and particular to a location.

It is against this background that the techniques described herein have been developed.

SUMMARY

Disclosed herein is a recognition device carried or worn by a human user, the recognition device including: a sensor that senses electrical signals conducted by the body of the human user; and a controller receptive of the electrical signals sensed by the sensor, the controller including a plurality of signatures for electrical signals produced by a corresponding plurality of types of electrical devices, the controller comparing the electrical signals sensed by the controller to the plurality of signatures to determine the type of electrical device that generated the electrical signals sensed by the sensor.

The sensor and controller may each be attached to a wristband worn by the human user. The sensor may be in contact with skin of the human user. The sensor may be sufficiently close to the skin of the human user to be capacitively coupled thereto. The sensor and controller may each be contained within a mobile electronic communication device carried or worn by the human user.

The controller may determine the geographic location of the recognition device and, based on the location, the controller uses the context of the location to assist in determining the type of electrical device that generated the electrical signals sensed by the sensor. The controller may determine the location of the recognition device by utilizing a global navigation satellite system.

The device may further include a user feedback device that provides information to the human user. The information may be at least one of audio, visual, or haptic feedback to the user. The user feedback device may include a vibrating mechanism. The user feedback device may include a display. The user feedback device may include a speaker. The user feedback device may provide information to the human user based on the type of electrical device that generated the electrical signals sensed by the sensor. The information provided to the human user may relate to operation of the type of electrical device that generated the electrical signals sensed by the sensor.

The controller may include a direct digital conversion receiver to receive RF electrical signals conducted by the body of the human user. The controller may include a software-defined radio to receive RF electrical signals conducted by the body of the human user.

The sensor may include one or more electrical conductors. The electrical signals may be a result of electromagnetic noise emitted by an electrical device in proximity to the human user. The electrical signals may be a result of electromagnetic noise emitted by an electrical device in direct contact with the human user. The electrical signals may be purposeful electromagnetic signals emitted by an electrical device. The device may provide on-touch object detection. The components of the device may be a portion of a smart watch.

The types of electrical devices may include consumer electronic devices, home appliances, automobiles, power tools, devices with motors, solenoids and other electromechanical actuators, and large conductive objects that effectively serve as antennas. The types of electrical devices may be free of a tag or sensor to communicate with the recognition device.

The controller may measure background noise present in the environment and adjusts the sensed electrical signals to remove the background environmental noise therefrom. The background environmental noise may be measured by taking the average of the sensed signals across a plurality of samples taken over a time period longer than one hundred milliseconds. The background environmental noise may be measured by taking the average of the sensed signals across a plurality of samples taken over a time period longer than one second.

The controller may compare the electrical signals to the plurality of signatures only in a range below 10 MHz, in a range below 3 MHz. or in a range below 1 MHz.

The controller may learn the signatures of electrical signals produced by one or more of the plurality of electrical devices encountered by the user. The controller may be placed into a learning mode by the user in order to learn the signatures of electrical signals produced by one or more of the plurality of electrical devices encountered by the user.

Also disclosed is a method of recognizing objects touched or in proximity with a human user, the method including: periodically measuring electromagnetic signals being conducted in the human user; comparing the measured electromagnetic signals to a library of electromagnetic signal signatures, wherein each signature corresponds to a different type of electrical device; based on the comparison, determining what type of electrical device the human user is in contact with; and providing information to the human user based at least in part on the type of electrical device that the human user is in contact with.

The method may further include determining the background electromagnetic signals and subtracting a value related to the background electromagnetic signals from the measured electromagnetic signals to provide background-adjusted measured electromagnetic signals to be used in the comparison.

Also disclosed is a recognition device, including: a sensor that senses electrical signals conducted by the body of the human user; a controller receptive of the electrical signals sensed by the sensor, the controller including a plurality of signatures for electrical signals produced by a corresponding plurality of types of electrical devices, the controller comparing the electrical signals sensed by the controller to the plurality of signatures to determine the type of electrical device that generated the electrical signals sensed by the sensor; and a user feedback device that provides information to a human user based on the determined type of electrical device.

DETAILED DESCRIPTION

Figure 1:
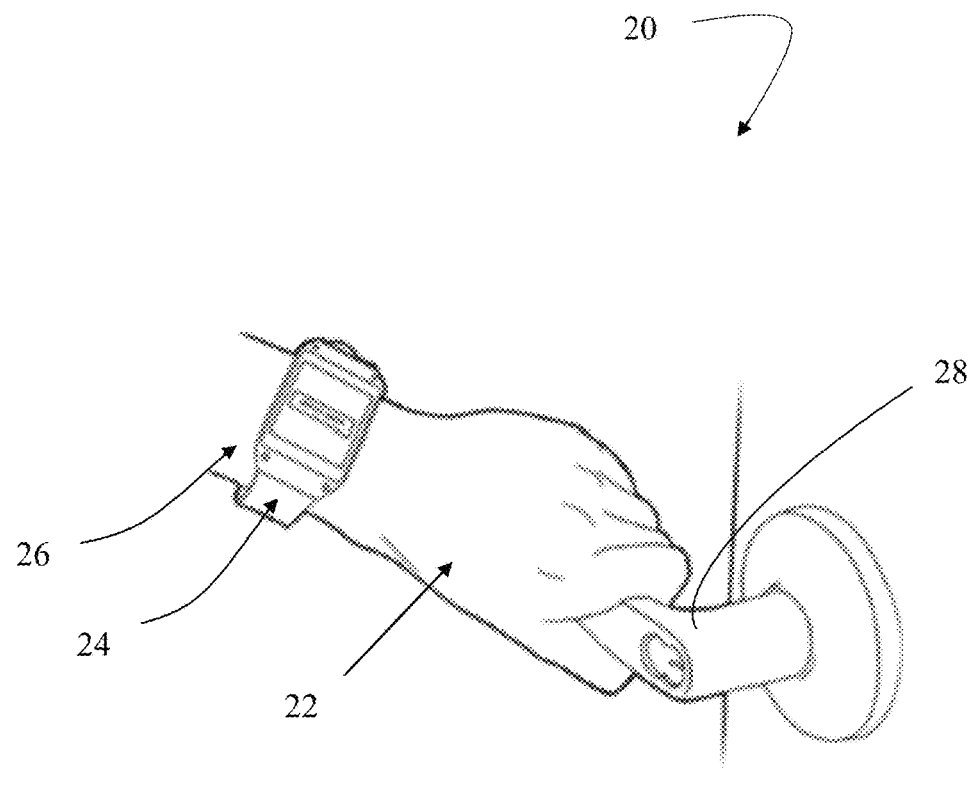
FIG. 1 is an illustration of a sensing device worn on a wrist of a human user.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

As part of addressing the problems described in the background above, it has been recognized that a novel sensing approach can be used for object detection, triggered only when objects are physically touched. Our approach exploits unintentional EM noise emitted by many everyday electrical and electro-mechanical objects, such as kitchen appliances, devices with motors, solenoids, and other actuators, computing and other consumer devices, power tools, and automobiles. These signals tend to be highly characteristic, owing to unique internal operations (e.g., brushless motors, capacitive touchscreens, etc.) and different enclosure designs, material composition, and shielding. When a user makes physical contact with these objects, electrical signals propagate through the user's body, as it is conductive. By modifying an off-the-shelf or commodity software-defined radio receiver, we can detect and classify these signals in real time, enabling robust, on-touch object detection.

Our approach, which we call EM-Sense, utilizes low-cost, commodity hardware and is small enough to be worn on the wrist or, in the near future, integrated into smartwatches. We draw inspiration from the sensing principles introduced in Humantenna: Using the Body as an Antenna for Real-Time Whole-Body Interaction, Proceedings of ACM CHI 2011, and we move beyond merely environment localization and gesture recognition, to focus instead on context and activity sensing made possible through object interaction detection. Of course, as stated, it is only inspirational since our approach goes far beyond the Humantenna teachings by Cohn et al. Unlike existing approaches requiring object instrumentation (RFIDs, barcodes, BLE beacons, etc.), EM-Sense can identify objects solely on their EM signatures.

Discussed herein is:

A sensing approach utilizing low-cost, wearable hardware for recognizing handled electrical and electromechanical objects based on body-coupled EM signatures;

A novel hardware and software implementation, transforming a low-cost software defined radio receiver into a fast, wideband, general purpose EM sensor;

A series of studies showing that our sensing approach is accurate, robust, and consistent across users, environments and time; and A series of example applications illustrating powerful assistive, context-sensing, and communication applications across a wide range of activities and environments.

Traditional activity recognition systems infer user state based on temporal data of physical movement (e.g., accelerometers). These systems require individuals to wear sensors or have a smartphone continuously monitoring data. Extensive prior work has demonstrated promising results for determining user activities such as running, walking, and sitting. However, motion-driven approaches by themselves lack context to infer higher-level activities.

For this reason, we pursue a complementary approach that recognizes "handled" objects (those which are actually/physically touched by a user). This approach provides relevant information more closely reflecting a user's immediate environment and activity. As stated previously, many approaches have been considered for object recognition, though those methods require objects to be instrumented with some form of marker or sensor. These can provide robust recognition, but as there are many objects in the world, installation and maintenance of such systems is troublesome and costly.

Recent work from Maekawa and colleagues cleverly utilized magnetic sensors and hand-worn coils to detect objects based on temporal changes in the magnetic field during an object's operation. Although related, magnetic induction relies on proximate contact between objects and the sensing apparatus, which means object detection is strongly affected by hand posture and inherent magnetic noise in the body, or even diamagnetic properties of hands and fingers. Conversely, as we will show, our approach is robust across users, time, and hand/body posture.

Visual, Acoustic, and RF-Based Approaches:

Early research into visual markers used one-dimensional barcodes, and more recently, fiducial markers as unique identifiers. Further, there is considerable work in the computer vision domain for object recognition in natural scenes with-out artificial markers, as well as efforts that leverage crowd workers. These schemes require cameras, line of sight, and suitable lighting conditions.

Acoustic-based object recognition has also been explored extensively. For example, Acoustic Barcodes described tags with sound-producing physical notches that resolve to a binary identifier (ID). Slightly closer to our approach are acoustic methods that attempt to recognize objects from vibro-acoustic information generated by operation of a device. For example, Ward et al. used worn accelerometers and microphones to classify workshop tools.

Also popular are RFID-based approaches. Example systems include a wrist-worn, near-field RFID reading system that could identify objects affixed with tiny RFID tags. Similarly, Buettner et al. used the Wireless Identification and Sensing Platform (WISP), which is a battery-free, long-range RFID tag enhanced with an accelerometer to detect movement of a tagged object. Other object recognition efforts exist that use wi-fi sensing, NFCs, Bluetooth Low Energy, and body-area networks.

EM-Based Sensing:

There are two main classes of EM-based sensing techniques: 1) infrastructure-mediated sensing and 2) using the human body as an antenna. The former instruments the infrastructure, while the second instruments the user.

Infrastructure-Mediated Sensing:

Early work by Abott and Hart in the 1980s used metering devices attached to a building's electrical lines to detect "events" caused by home appliances. Because the electrical lines in a house are shared infrastructure, a single sensor can observe activity across the entire home. These pioneering efforts inspired infrastructure-mediated sensing (IMS), i.e., attaching probes to a variety of utility infrastructures, including HVACs, plumbing, natural gas lines, lighting, and electrical wiring.

Using the Human Body as an Antenna:

Because the human body is conductive, it has electrical properties that allow it to behave much like an antenna. Pioneering work in the field of Human-Computer Interaction (HCI) has exploited this "body antenna effect." For example, in DiamondTouch, the human body is used as an electrical conductor, which allows the system to differentiate touches between users. More recently, in "Your Noise is My Command," Cohn et al. utilize the human body as an antenna for detecting EMI signals in the home. A small electrode is attached behind the neck of the user and connected to a backpack-bounded A/D converter. As the user moves around the home, the system captures all recorded EM noise received by the human antenna. With this setup, they inferred user location within a home, as well as detect different gestures and continuous touch tracking along a wall. A later extension enabled free-space, whole body gestures by utilizing EM Doppler shifts. Unlike infrastructure-mediated sensing, body-antenna EM sensing requires no instrumentation of the environment. Unfortunately, the Humantenna work did not include any sensing of the type of objects being used, touched, or in the vicinity of a user.

FIG. 1 shows a system 20 with a hand 22 of a human user with an EM sensing device 24 worn on the wrist 26 of the human. In this case, the hand 22 is in contact with a metal door handle 28 through which the human may receive electrical signals.

Figure 2:
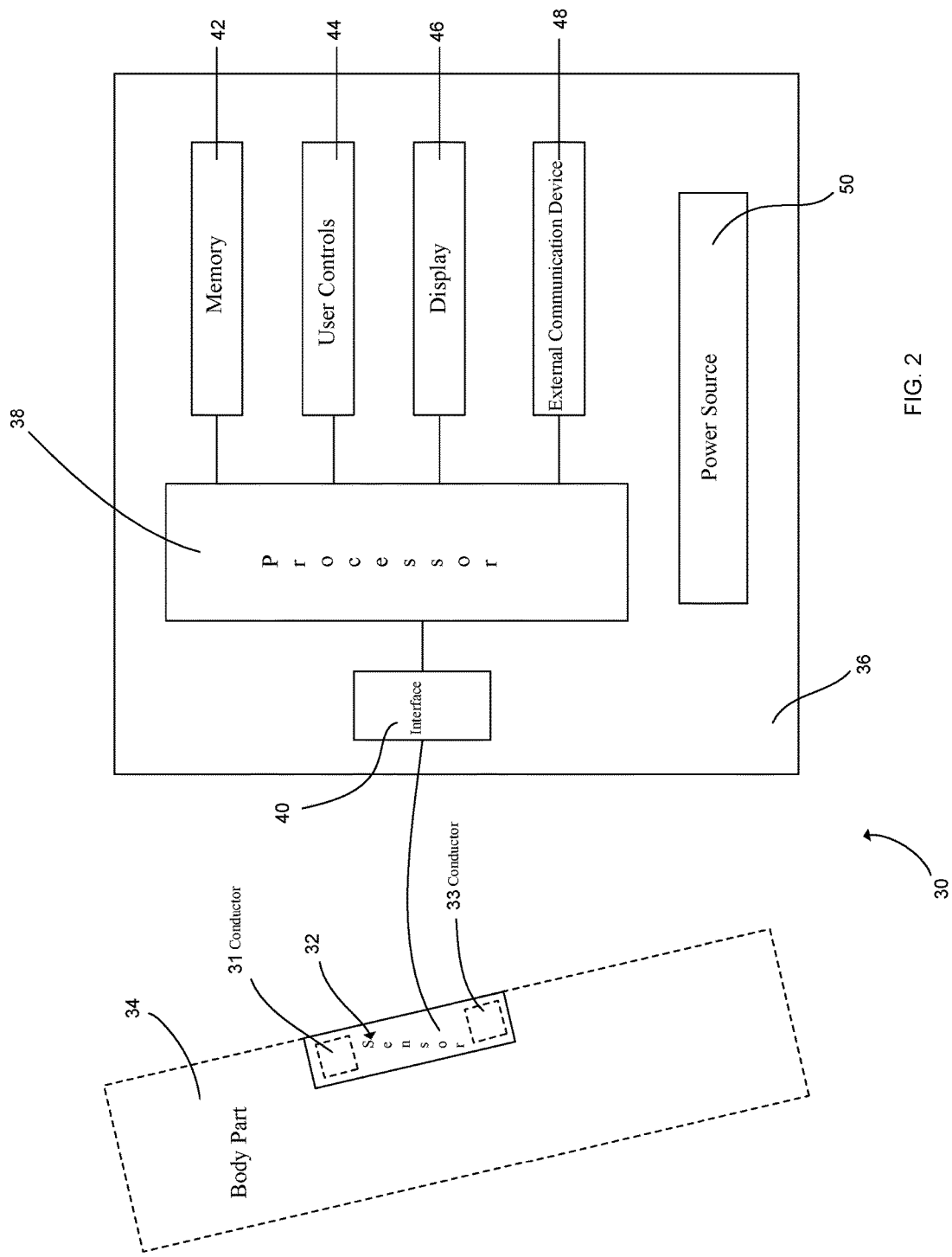
FIG. 2 is a general block diagram of the sensing device of FIG. 1.

FIG. 2 shows a block diagram of a system 30 that is similar to the system 20. In this case, the system 30 includes a sensor 32 that is in contact with the skin on a body part 34 of a human user. The sensor may include a first sensor element or conductor 31 and a second sensor element or conductor 33. Electrical signals sensed by the sensor 32 are provided to a processing portion 36 of the system 30. These signals are shown here as provided from the sensor 32 to the processing portion 36 by a wire or cable. It would also be possible to provide the signals via any type of wireless interface. The processing portion 36 may include a processor 38 to identify one or more objects that the human user is in contact with or in close proximity thereto. The processor 38 may receive the signals from the sensor 32 via an interface 40 that may include one or more active or passive components, including without limitation amplifiers, filters, analog-to-digital converters, and so on. The processing portion 36 may also include a memory 42 (or any other type of data storage device), user controls 44, a display 46, and an external communication device 48. The external communication device 48 is optional and could include one or more of a serial bus, Bluetooth, Wi-Fi, or any other means for communicating data externally. The processing portion 36 may also include a power source 50 (e.g., a battery or any other suitable source of power).

It should be noted that, while not theoretically required, the hardware implementations described herein targets and looks primarily at EM signals below 1 MHz. This is done for several reasons, which include: (a) the fact that there is more cost involved in looking for and processing higher frequency signals, and (b) there is plenty of interesting signal information in the range of 0 to 1 MHz. Nevertheless, the teachings herein apply equally to any other portions of the EM spectrum. For example, systems based hereon could look in a range under 10 MHz, a range under 3 MHz, as well as a range under 1 MHz, or in any other range. As an added benefit, FCC requirements for devices that operate above 1 MHz are tighter; whereas for devices that operate under 1 MHz, the only requirement is in volts/meter.

Exemplary EM-Sense Implementation

As mentioned, EM-Sense exploits the unintentional (and intentional) electromagnetic noise emitted by everyday electrical and electromechanical objects during regular operation. In this section, we describe our sensing technique and processing framework for real-time on-touch object detection.

Proof-of-Concept Setup:

For our proof-of-concept hardware implementation (and it should be understood that this is only an example and is not necessarily how the system might actually be implemented), we modified a software-defined radio receiver (SDR; such as a Realtek RTL2832U SDR) to function as an inexpensive, but extremely fast A/D converter. Originally, RTL-SDRs use a tuning chipset to listen for frequencies covering FM bands and beyond (25-1766 MHz). However, useful EM emissions for most objects fall well below this operating range. To address this limitation, we modified the RTL-SDR's circuitry by bypassing its tuner and routing raw antenna signals directly into the chipset's main A/D converter. It has an 8-bit resolution with ~2 Vpp.

As a result, this modification re-adjusts the device's sensing range to 1 Hz-28.8 MHz, making it possible to detect low-band EM signals present in many electrical and electromechanical objects. First, the IR receiver is removed, then the C1 and C2 capacitors are removed, and then a wideband transformer (e.g., a WB1010 1428D) is attached. Our sensing setup costs under $10, two orders of magnitude cheaper than previous EM sensing approaches. It should be understand that the use of the RTL chip and the modifications thereto are merely examples of how to create an extremely fast A/D converter.

To make the exemplary prototype wearable, we retrofitted the interior of an armband with copper tape, and connected it to the RTL-SDR's antenna terminal. Data received from the RTL-SDR is further processed through a software pipeline. First, we read from the RTL-SDR via a physical USB connection. At the time of research, no smartwatch on the market was capable of hosting a USB-OTG interface. In response, we offload USB-reading to a smartphone (e.g., Nexus 5), which is clipped to waist of the wearer, and uses an open source RTL-SDR driver (osmocom.org) we ported. In addition to reading the SDR, our smartwatch software also streams incoming data to a lap-top computer over wi-fi, which in turn performs signal processing and live classification. With this setup, we can wirelessly stream data sampled at 1 MHz with minimal packet loss. All of the physical components of EM-Sense fit into a wrist-worn apparatus, which could be easily integrated into future smartwatches.

Sensing Raw EM Signals:

Whenever a user makes physical contact with an electrical or electromechanical object, its EM signal propagates through the body and is sensed by a conducting electrode worn on the user's wrist. Connected to this electrode is our modified software-defined radio, which converts this analog signal into digital data. We sample incoming signals at 1 MHz; thus our theoretical Nyquist limit is 500 kHz.

We note that neighboring objects and signals (e.g., objects proximate to the user, but not in direct physical contact) can introduce interference through capacitive coupling and the body antenna effect. However, these signals are comparatively weak compared to those transmitted by actual physical contact, and do not appear to affect detection.

Baseband Shift:

To extend our effective bandwidth, we shift the SDR receiver's baseband frequency to 500 kHz. Without shifting, the frequency spectrum is symmetric because it is a real signal. In this mode, the effective bandwidth for a signal sampled at 1 Ms/s is −0.5 MHz to 0.5 MHz. Shifting to 500 kHz moves the bandpass sampling window from 0 to 1 MHz (0.5 MHz and above will be undersampled, but still useful). As a result, the left-shifted spectrum contains no redundant information. We then apply a fast Fourier Transform (with an FFT size of 16384 bins; i.e., 61 Hz per band), and the resulting frequency domain values become the primary input for our sensing and classification pipeline.

To enable robust object detection, our sensing approach must differentiate between background environmental EM noise and EM signals from objects. In addition to differences in amplitude (touched objects generally transmit more signal), we also take advantage of the fact that background environmental EM noise tends to change at a slower rate, while EM signals change rapidly at the moment an object is touched or released (or the object is turned on/off). These events appear as high delta "spiking" events in the signal.

We build a model of background environmental EM noise using an adaptive background subtraction approach: an average frequency spectrum derived from a six-second rolling window, updated every 100 ms (of course, other suitable values could be used for the length of the window (e.g., it could be as small as one second or less and as large as ten seconds or more) and the time between updates). This provides a baseline "noise profile" from which we can subtract the live signal, amplifying transitions in touch state.

In this particular implementation, if an object is held for a few seconds, its EM signal is integrated into the noise profile. The release of an object thus generates a large negative change, which is interpreted as a "touch up" event, signifying the object is no longer held.

Object Signal Extraction:

To extract EM signals generated from object on-touch events, we perform real-time statistical analysis between the modeled noise profile and all incoming EM readings. We compute a baseline threshold signal based on the statistical Z-score of the individual frequency bands in the noise profile. Essentially, frequency bands whose values are above a specified Z-score (e.g., 3.5 standard deviations above the noise profile) are amplified, while frequencies below the threshold are set to zero.

Thus, a frequency band at index n of the extracted EM signal, S, can be characterized as:

$$S_n = A \times \max(0, F_n - (G_n + z\sigma_n))$$

where F is the incoming EM reading, G is the noise profile, σ holds the standard deviations for each frequency band at index n, A denotes the amplification factor, and z is a constant that denotes a statistical z-score parameter. In our implementation, we use an amplification factor of 18 and a z-score of +3.5 (upper 0.1% of a normal distribution curve). We note that slow-changing signals will eventually become indistinguishable from the noise profile over time (e.g., a user continuously touching an object for more than 10 seconds). That is, an object's EM signature will eventually become part of the background environmental noise profile if it stays unchanged after a prolonged period. Regardless, this tradeoff allows EM-Sense to perform automatic on-touch detection without manual noise calibration or a priori knowledge of an object's EM signature.

Live Object Classification:

Once an object's EM signature is decoupled from background environmental noise, we use it as input for live object classification. First, we downsample the EM signature's FFT into 512 frequency bands. From this, we generate ~2K additional features based on: 1st and 2nd Derivatives (1021 features), min index, max index, RMS, center of mass, standard deviation, area under the curve, pair-wise band ratios (496 features), spectral kurtosis, and crest factor.

These features are fed into a SMO-trained Support Vector Machine (c=1.0, ϵ=1-12, poly kernel) provided by the Weka Toolkit. Feature selection analysis revealed that derivatives, band ratios, and max index serve as the important distinguishing features (providing 80% merit), but the remaining features nonetheless are important to fully capturing nuanced signal behaviors. Other machine learning techniques could potentially allow EM-Sense to scale to larger collections of objects. Object classification can be treated as an "information retrieval" problem, which means that techniques such as clustering, similarity metrics, and deep-learning methods are applicable.

Figure 3:
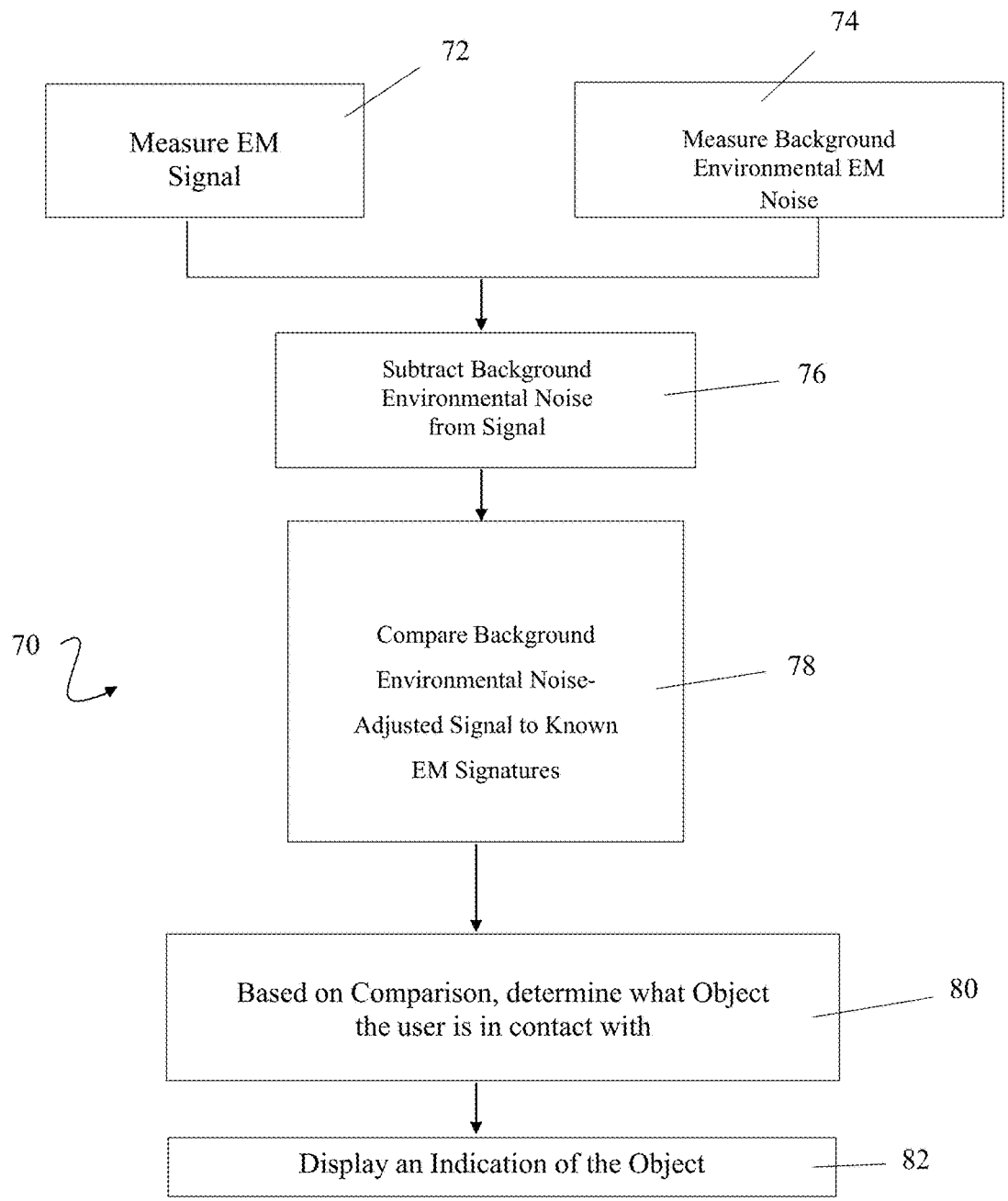
FIG. 3 is a general flowchart of a process used by sensing devices described herein.

FIG. 3 generally shows a process 70 that may be followed. An EM signal is measured (72) and a background environmental EM noise is measured (74). The background environmental noise is subtracted (76) from the EM signal. As is described elsewhere, there may be an additional factor that can be subtracted so that only statistically significant EM signals remain. The background environmental noise-adjusted signal is compared (78) to known EM signatures. These known signatures can be stored in a library. Optionally, these known signatures can be learned as part of a learning phase that the sensing device can be placed in. Based on the comparison, a determination is made (80) of what object the user is in contact with. An indication of the object can then be displayed (82) on a display such as the display 46 of the system 30.

Figure 4:
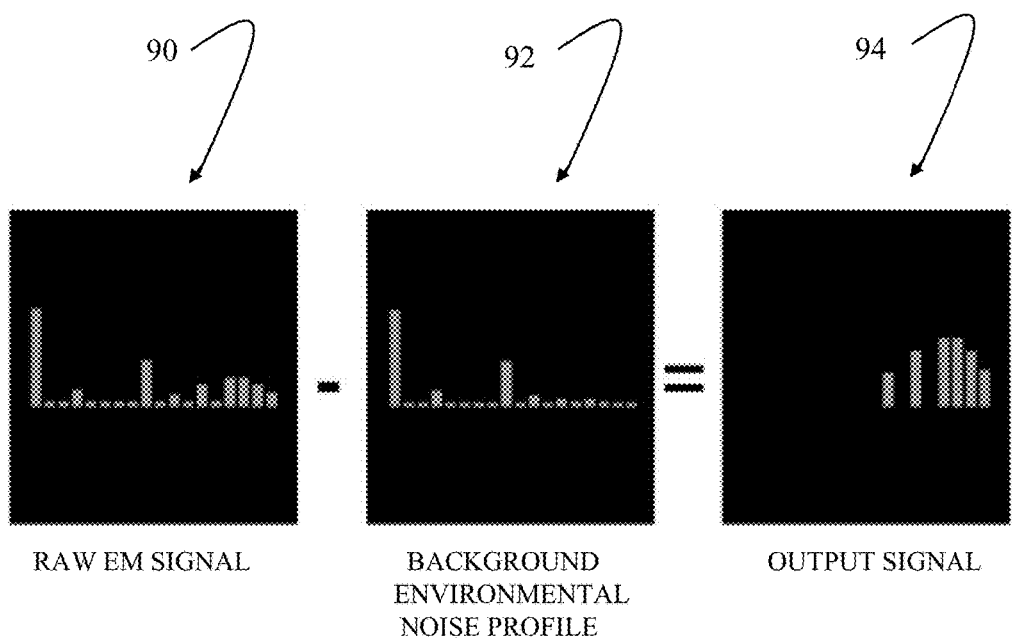
FIG. 4 is an illustration of signal processing performed by sensing devices described herein.

A representation of a raw EM signal 90 (shown with amplitude plotted against frequency bins) is shown in FIG. 4. A (similarly-plotted) background environmental noise profile 92 is also shown, as is a (similarly-plotted) output signal which results from subtracting the noise profile 92 from the raw EM signal 90. As can be seen, the output signal 94 primarily includes the portion of the raw EM signal 90 that differs significantly from (or exceeds) the background environmental noise profile 92.

Figure 5:
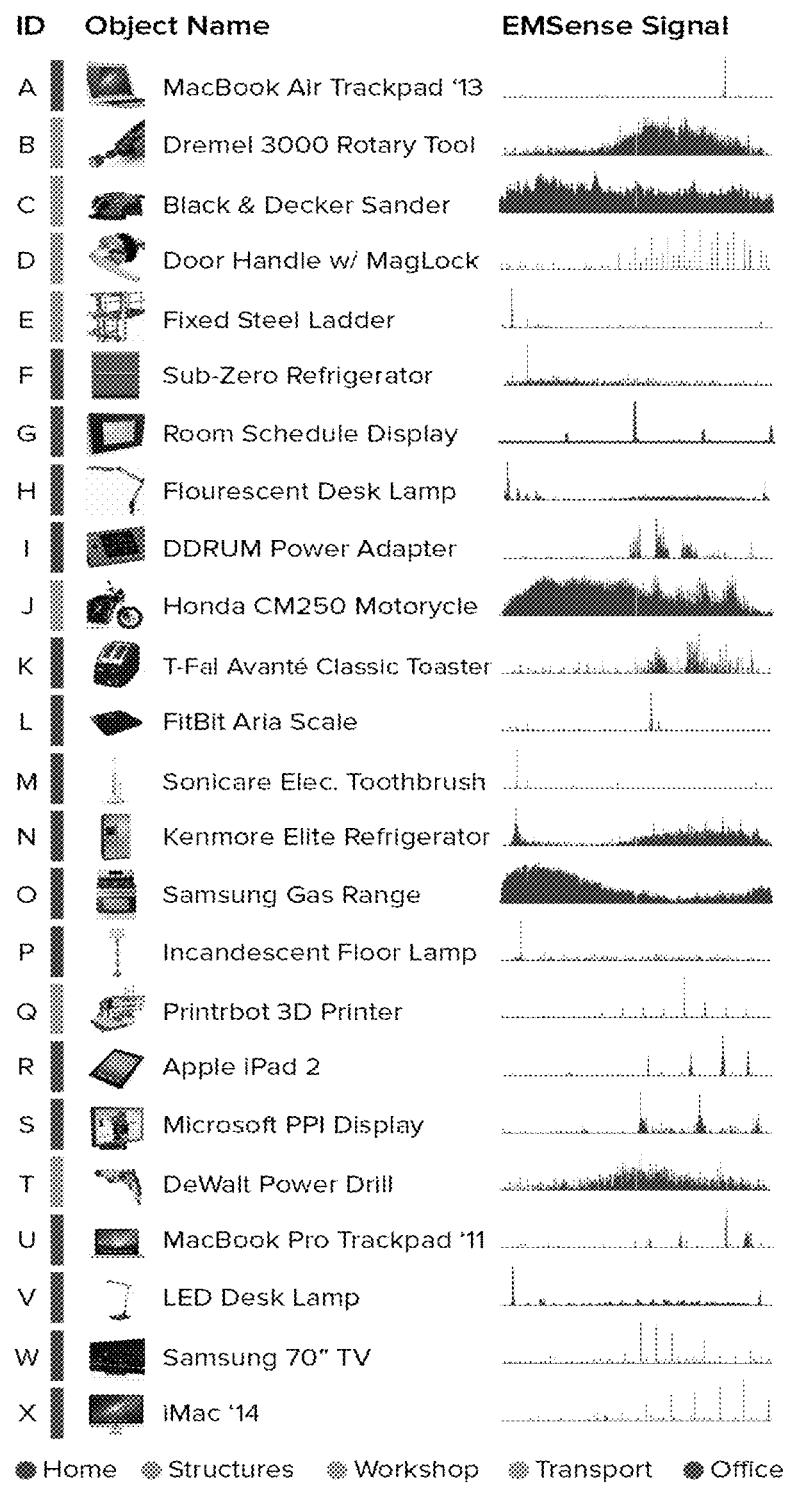
FIG. 5 is an illustration of the EM noise profiles of a variety of consumer devices.

FIG. 5 shows a table of modern consumer devices and their EM noise profile (plotted as signal magnitude versus frequency; for example across the frequency spectrum from 0 to 1 MHz). As can be seen, each of the consumer devices has a distinct EM noise profile.

Figure 6:
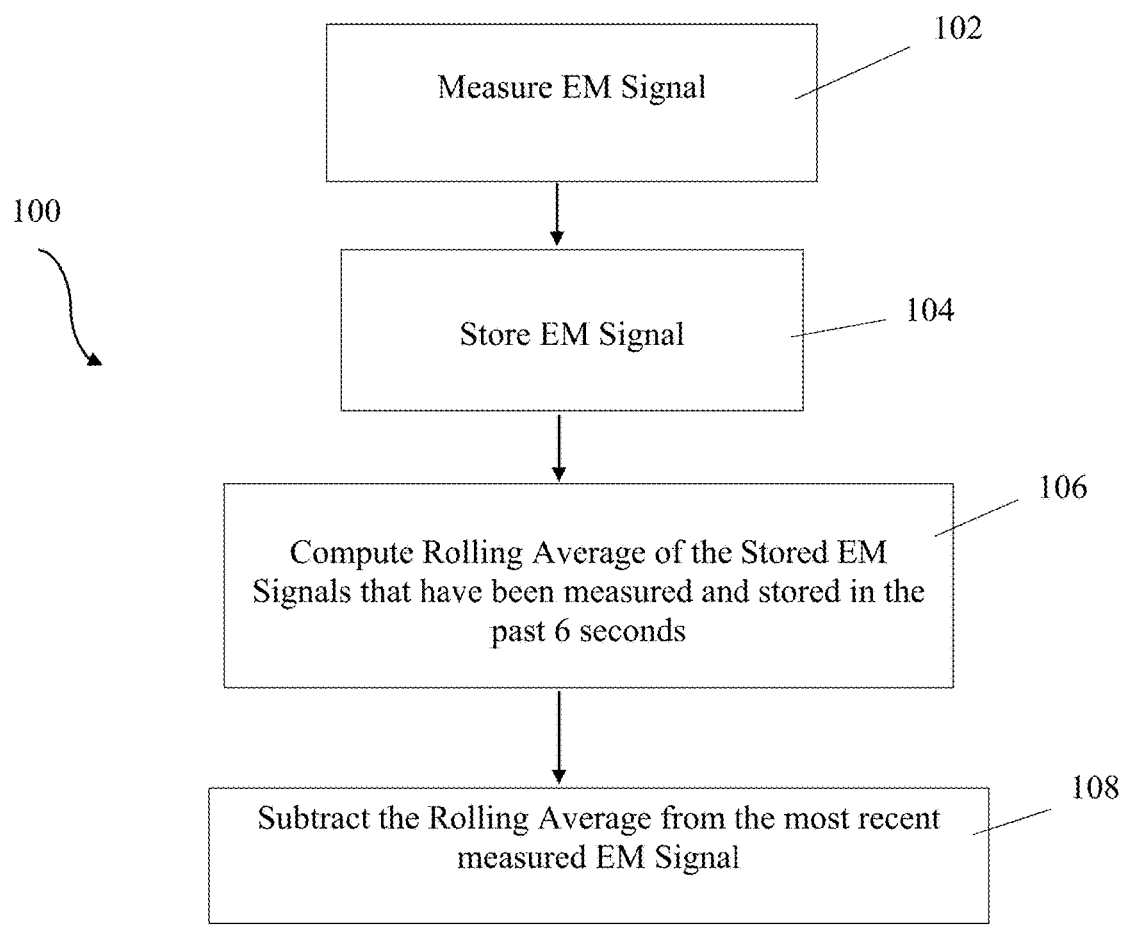
FIG. 6 is a general flowchart of signal processing within sensing devices described herein.

FIG. 6 provides further detail about how operations 72, 74, and 76 could be performed. Shown is a process 100 that includes measuring (102) an EM signal and then storing (104) the EM signal. A rolling average of the stored EM signals over the past 6 seconds is computed (106). This rolling average represents the environmental (or background) EM noise. The computed background environmental noise is subtracted (108) from the most-recently measured EM signal.

Figure 7:
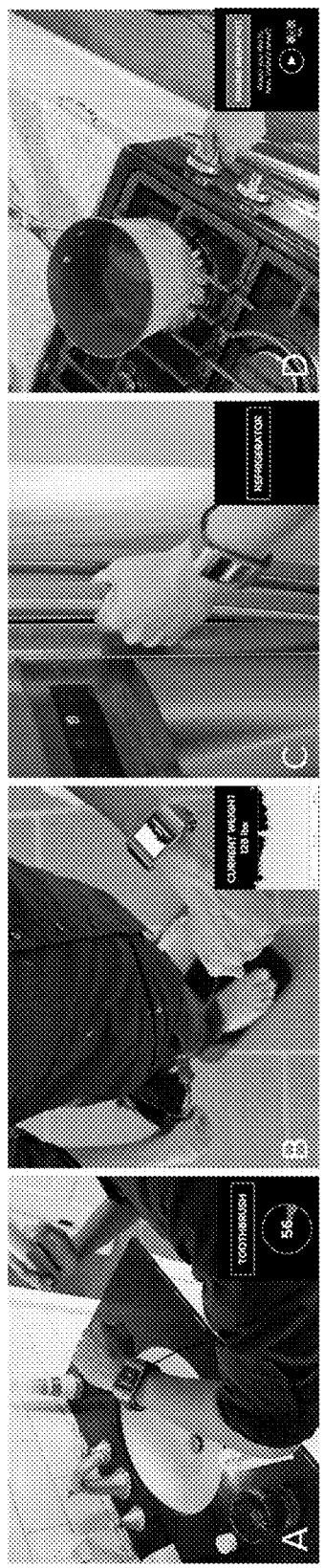
FIG. 7 is an illustration of various uses of the sensing device in the home.
Figure 8:
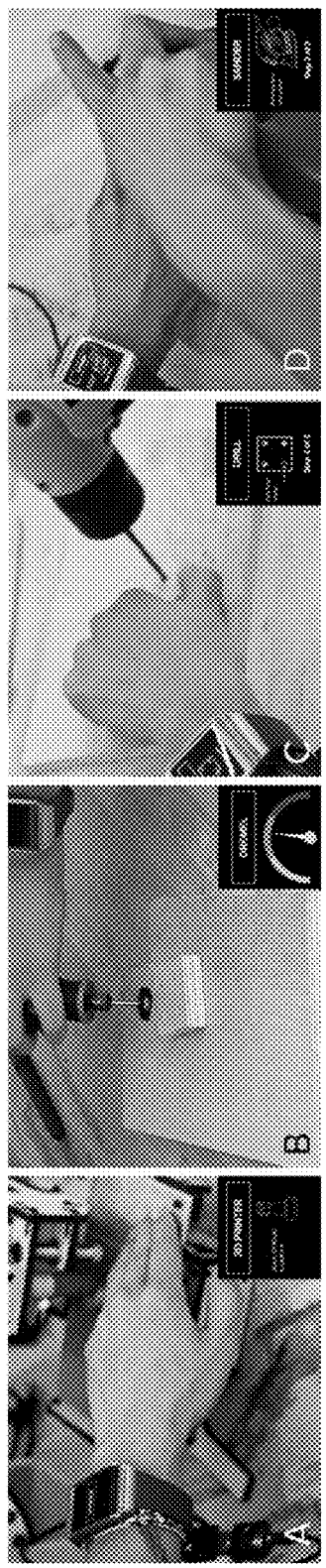
FIG. 8 is an illustration of various uses of the sensing device in the shop.
Figure 9:
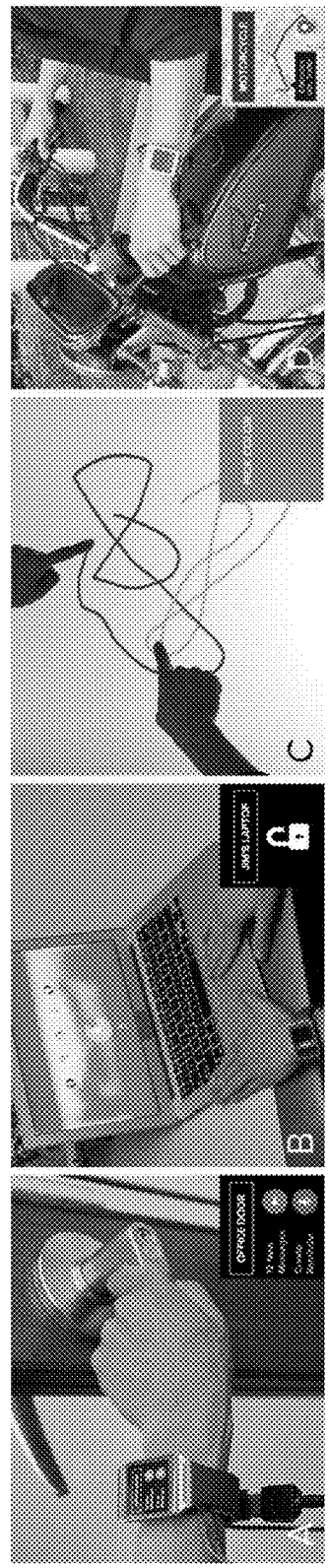
FIG. 9 is an illustration of various uses of the sensing device in the workplace.

Example Use Scenarios:

To demonstrate how EM-Sense can augment activities across a wide range of contexts and environments, we provide a usage narrative contextualized in a hypothetical user's day. Although meant to be illustrative, we built fully functional versions of every application described here (see FIGS. 7 through 9). This narrative includes five categories of objects: home, office, workshop, fixed structures, and transportation—a taxonomy we employ in our subsequent evaluation.

Home—At home, Julia wakes up and gets ready for another productive day at work. Her EM-Sense-capable smart-watch informs and augments her activities throughout the day. For instance, when Julia grabs her electric toothbrush, EM-Sense automatically starts a timer (FIG. 7A). When she steps on a scale, a scrollable history of her weight is displayed on her smartwatch automatically (FIG. 7B). Down in the kitchen, EM-Sense detects patterns of appliance touches, such as the refrigerator (FIG. 7C) and the stove. From this and the time of day, EM-Sense infers that Julia is cooking breakfast and fetches the morning news, which can be played from her smartwatch (FIG. 7D).

Fixed Structures—When Julia arrives at the office, EM-Sense detects when she grasps the handle of her office door. She is then notified about imminent calendar events and waiting messages: "You have 12 messages and a meeting in 8 minutes" (FIG. 8A). Julia then leaves a reminder—tagged to the door handle—to be played at the end of the day: "Don't forget to pick up milk on the way home."

Workshop—In the workshop, EM-Sense assists Julia in her fabrication project. First, Julia checks the remaining time of a 3D print by touching anywhere on the print bed—"five minutes left" (FIG. 9A)—perfect timing to finish a complementary wood base. Next, Julia uses a Dremel tool to cut (and a rotatory speed is displayed on the smartwatch screen (FIG. 9B)). If it knows the task, it can even recommend the ideal speed. Similarly, as Julia uses other tools in the workshop, a tutorial displayed on the smartwatch automatically advances (FIGS. 9C and 9D). Finally, the 3D print is done and the finished pieces are fitted together.

Office—Back at her desk, Julia continues work on her laptop. By simply touching the trackpad, EM-Sense automatically authenticates Julia without needing a password (FIG. 8B). Later in the day, Julia meets with a colleague to work on a collaborative task. They use a large multi-touch screen to brainstorm ideas. Their EM-Sense-capable smartwatches make it possible to know when each user makes contact with the screen. This information is then transmitted to the large touchscreen, allowing it to differentiate their touch inputs. With this, both Julia and her colleague can use distinct tools (e.g., pens with different colors); their smartwatches provide personal color selection, tools, and settings (FIG. 8C).

Transportation—At the end of the day, Julia closes her office door and the reminder she left earlier is played back: "Don't forget to pick up milk on the way home." In the parking lot, Julia starts her motorcycle. EM-Sense detects her mode of transportation automatically (e.g., bus, car, bicycle) and provides her with a route overview: "You are 10 minutes from home, with light traffic" (FIG. 9D).

EM-Sense Interactions:

We built our example use scenario, described above, around six interaction categories, which we describe briefly.

Object-Specific Applications—When a user handles objects with known EM signatures, EM-Sense can launch object-specific applications. For example, our electric toothbrush example launched a timer application.

Object Sequence Applications—It is also possible to launch applications based on sequences and patterns of object events. Combined with other readily accessible features, such as time of day and rough geospatial location, activity and context recognition is possible. For example, a pattern of activation in the kitchen suggesting dinner preparation can launch music, recipe, and other applications.

Object State Recognition—We can further extend object-specific applications by utilizing changes in an object's EM signature in different operational modes. We demonstrated this in our Dremel tool application depicting a "speedometer".

Authentication—A smartwatch with EM-Sense could allow users to authenticate across devices and applications, potentially without passwords. For example, to log in into a laptop, a user can simply touch the trackpad. Because the smartwatch knows that a trackpad is being touched, and the trackpad knows that it is being touched, a handshake mediated by the cloud could proceed (using e.g., temporal co-occurrence of events). For added security, a confirmation button can be displayed on the owner's smartwatch.

User Differentiation—Similar to the authentication interaction above, knowledge of touchscreen events provided by EM-Sense could be used to differentiate users in groupware applications, which have many uses. Specifically, a wearer's smartwatch knows the time of touch contact, which can be paired (e.g., in the cloud) to a touch event registered on a shared screen. Because the smart-watch knows its owner, touches can be attributed and parameterized to a specific user—in our example day, we used the watch display for a personalized color selector.

Object-Tagged Messaging—Knowledge of which objects are being handled also enables tagging of items with media, such as text and voice messages. In our example day, Julia leaves a message for herself by tagging her office's door handle. By using names, it would also be possible to leave messages for particular people.

Evaluation: We ran multiple studies evaluating several facets of EM-Sense. These studies serve several purposes: 1) to evaluate the accuracy and robustness of our sensing approach across different users, 2) to observe the longitudinal consistency of object EM signatures over time, and 3) to form a baseline understanding of the uniqueness of EM signatures across a wide range of objects. We also conducted several smaller supporting studies, which explore other important aspects of EM-Sense, including signal similarity across similar devices and object state recognition. Overall, EM-Sense enables an expansive range of applications (see Applications section), and in our evaluation, we endeavored to select objects reflecting diverse contexts and environments.

Accuracy and Longitudinal Consistency:

This study aims to evaluate the sensing accuracy of EM-Sense across different users, and determine whether object EM signatures are consistent over time. Because our sensing technique relies on the conductivity of the human body, our approach can be sensitive to differences in anatomy. Thus, we recruited 12 adult participants (5 female, age range 22-40, 1 left-handed), encompassing different statures and body types (mean height=67 in., mean weight=148 lbs., BMI range 20-28).

To further test sensing robustness, each study session was split across two different buildings, and we used data collected from a single user six weeks prior to the user study (i.e., no per user training or calibration). Nine objects were evaluated, dispersed across our two locations: MacBook Air trackpad, mouse sander, door handle with an electro-magnetic lock, fixed steel ladder, refrigerator, ArmorActive conference room touchscreen affixed to a wall, fluorescent desk lamp, power adapter, and a Dremel rotary tool.

For logistical convenience, all experiments started in our first location. Participants were asked to wear our prototype on their preferred arm (anecdotally, we noticed participants preferred to wear the device on their non-dominant arm, as is the norm for watches). For each trial, an experimenter announced an object name (e.g., "Dremel"), and participants were asked to touch, grasp, or operate the object. The experimenter recorded the real-time prediction made by EM-Sense. Objects were requested in a random order, appearing five times each in total. Participants were free to interact with objects with either or both hands. Each session took approximately 45 minutes to complete.

Across nine objects, 12 users, two locations, and using data trained on one user collected six weeks prior, EM-Sense achieved an average overall accuracy of 96.1% (STDEV=4.9%, chance 11%). This result is promising given the strict constraints imposed on our training data. Some objects achieved an accuracy of 100% (lowest is 85%, Sub-Zero Refrigerator). While not the focus of the study, we can report anecdotally that signal magnitudes appear stronger when the prototype is worn on the same arm as the hand touching the object (consistent with prior findings). Overall, our results indicate that sensing is accurate and robust across different users and that object EM signatures are consistent over time.

To more fully explore the uniqueness of EM Signatures across many objects, we ran a second study that collected data from 23 objects across four locations (1 outdoor). This set was composed of our initial nine objects, plus fourteen new objects that spanned a wider range of contexts and environments, including the home, office, workshop, large structural features, and transportation. We also included similar objects (same category, but different models) to see if this caused classification confusion. Specifically, we include two refrigerators, two Apple laptops, three lamps, and four devices where the LCD display is touched (ArmorActive conference room touchscreen, iPad, Samsung TV, and Microsoft PPI display).

Ideally, we would perform this evaluation with actual users, but the large number of objects and locations was unwieldy for study participants. As a result, we performed an offline analysis. Three rounds of data were collected for each object, with at least 15 minutes between rounds. We utilized the first two rounds of data for training and the final round for testing. This procedure prevents the model from over-fitting on time-adjacent instances (e.g., inherent similarities in touches when performed back-to-back), therefore more closely reflecting real-world conditions. For each object, a round consisted of collecting 250 instances with various hand poses to aid classifier generality. In total, we collected 17,250 data points (23 objects×3 rounds×250 instances). We also added a null, "no object touched" class, increasing the set to 24. We then trained a single SVM model using the aforementioned features and parameters.

Across these 24 classes, our system achieved an overall accuracy of 97.9% (STDEV=4.3%, chance 4%), which suggests object EM signatures are reasonably unique and discriminable. Note that the majority of objects (18 of the 24) reach an accuracy of 100%, while the lowest object accuracy is at 85.6% (Samsung Gas Range). These results are promising given the large number of classes and the low volume of training instances per object.

EM Signatures of Similar Objects:

As noted previously, we purposely included multiple objects of the same category, but different models, to see if similar devices would produce similar EM signals, and thus result in classification confusion. For our two refrigerators (FIG. 5, F and N), two Apple laptops (A and U), and four LCD devices (G, R, S and W), there was 0% confusion. We found 1% confusion between the incandescent lamp (P) and the fluorescent lamp (H). These results strongly suggest that objects within a common category still have their own unique EM signatures.

EM Signatures of Identical Objects:

We ran a supplemental study to determine if EM signals are consistent across identical objects. For this, we used the ArmorActive touchscreens installed at four conference rooms in an office setting. We used the 24-object classifier from our second study, which was trained on one of these devices six weeks prior. We then evaluated real-time classification accuracy on all four units. We ran 10 randomized touch trials per device, for a total of 40 trials. Our EM-Sense classifier correctly identified the object as the ArmorActive touchscreen 100% of the time (chance is 4%).

We conducted the same study on five iMac 2014 computers. We gathered training data on one machine, and ran 10 randomized classification trials on all five machines, for a total of 50 trials. Similarly, our classifier correctly classified these as iMacs with 98% accuracy (chance 4%).

Overall, these results suggest that the EM signatures of identical devices are very similar, allowing for object recognition, even when that particular instance of the object has never been touched before. This is beneficial, as it means EM-Sense capable devices could be preloaded with an EM signature database of known objects (or e.g., use a database in the cloud).

Inferring Object State:

For some objects, it is also possible to infer the operational state based on EM signature. For example, the magnitude of a power drill's EM signal is generally proportional to the rotational speed of its motor. In response, we ran another supplemental study to determine whether EM-Sense can exploit this phenomenon.

We trained an EM-Sense classifier to detect four operational speeds of a Dremel 3000 rotary tool: OFF, LOW, MID, and HIGH. A total of 200 instances were collected per state. Of note, we tweaked our EM-Sense noise-detection parameters (e.g., from 6 s to 60 s) to delay the system from integrating EM signals into its background noise profile. Across 40 trials (10 trials per state), our system achieved a real-time classification accuracy of 92.5% across the four speeds, suggesting that variations in EM signal can also reveal object state.

Discussion and Limitations:

Because we perform adaptive background subtraction, our technique is location independent. In fact, most portable objects in our study (Dremel, laptop, iPad, etc.) were trained in one location (again, 6 weeks prior), and tested in another location without issue. Throughout piloting, we never observed a location effect. However, large passive objects, like the ladder, which are an amalgamation of EM signals from their respective local environments, would change if relocated.

Our approach is passive, capturing noise, but not generating any signals itself. As we have discussed, this limits us to certain classes of objects. Indeed, most objects do not generate EM signals (e.g., chairs, cups, books). Thus, our sensing scope is generally limited to electrical and electro-mechanical objects (and some large static objects, as discussed previously). Even still, not all of these objects are detectable, as the strength of EM signals is subject to the physical design of objects (e.g., variations in electrical shielding and grounding). Moreover, some frequencies of noise may not be (faithfully) conducted through the human body and thus not reach our smartwatch-bound sensor.

Additionally, high fidelity analog sensing requires a stable and strong electrical ground as a reference. In our prototype, we tried to faithfully replicate the grounding conditions of a smartwatch, which contains a small battery. Additionally, our SDR receiver only provided 8-bit ADC resolution. With a superior ground reference and increased resolution (i.e., a commercial-level implementation), EM-Sense may support even larger sets of objects.

Finally, it was noticed in some cases that very strong background environment noise (e.g., transmitters that broadcast in overlapping bands of interest, or a microwave oven in operation) raised the noise floor and overpowered local EM signals. Even when noise subtraction is applied, high intensity noise can blanket subtle but discriminative EM signals. Additionally, because our sensor is worn on the arm, it is subject to frequent movements, which can cause unintended electrical effects (e.g., Doppler shifts). Movement information from accelerometers and gyroscopes could compensate for sudden arm movements, or simply pause classification. Anecdotally, however, these effects appear to be minor.

As can be appreciated, one aspect of the teachings herein is the novel intersection of (a) collecting EMI information, (b) by using the body to collect the EMI information, (c) determining what object is proximate or touched by the user from the EMI information, and (d) indicating to the user the object, or more importantly contextual information based on one or more of the object, the time of day, the geographic location, and other factors. Various sub-combinations of these aspects may also be novel as may combinations or sub-combinations that include other features/functions. Another novel aspect of the teachings herein is that this functionality is accomplished without (free of) the object having an RFID tag or any other type of tag to indicate to a sensor what type of object it is.

As used herein the phrase "electrical devices" includes (a) electro-mechanical devices such as motors, generators, and the like, (b) purely electrical devices that do not include any moving mechanical parts, (c) any device that emits electromagnetic radiation, and (d) any electrically conductive device that is conducting electrical signals. Active electrical devices include those devices that generate electrical signals and passive electrical devices include those that act as an antenna and are induced to conduct electrical signals. By and large, passive electrical devices are highly location dependent while active electrical devices are much less location dependent as to the electrical signals that can be sensed therefrom.

Further, it should be noted, that an SDR is just one example of how to implement the teachings herein. As an alternative, a high frequency ADC could also serve the purpose. Also, the components of any sensing device based upon the teachings herein could all be embodied in a single device or housing (such as in a smart watch), or they could be distributed amongst one or more separately-housed devices (such as with a sensor that communicates signal information to a computing device such as any type of portable computing device, which may include a smart-phone). Further, while the examples herein have discussed a sensing device worn on the wrist and a smart watch or smartphone, it should be understood that the teachings herein could be equally applicable to other objects carried or worn by a user (e.g., a belt, smart jewelry, eyeglasses, and the like). In addition, while the sensing devices herein have been described as being in contact with the skin, it is also possible to sense the electrical signals conducted by the body by a sensor that is sufficiently close to the body/skin to sense the electrical signals by capacitive coupling. Also, at times in this description the word "noise" or other terms for unintentionally generated signals have been used to describe the electromagnetic signals sensed. In fact, in some cases the electromagnetic signal that is sensed is actually an intended or purposeful signal produced by the device (e.g., the electromagnetic signal that our device would sense from a capacitive touchscreen). Still further, it is possible that the sensing device and the controller could either or each be located in a position that is not worn or carried by the user. There are many examples of how this could be accomplished, but at least one is in or on a device that travels with the user (e.g., a wheelchair, scooter, walker, or any other type of mobile device. Similarly, another example might be in a fixed position proximate to a user's work area or the like.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A recognition device carried or worn by a human user, the recognition device comprising:
 a sensor that senses electrical signals conducted by the body of the human user, wherein the electrical signals are a result of electromagnetic energy emitted by an electrical device in proximity to the human user; and
 a controller receptive of the electrical signals sensed by the sensor, the controller including a plurality of signatures for electrical signals produced by a corresponding plurality of types of electrical devices, the controller comparing the electrical signals sensed by the controller to the plurality of signatures to determine the type of electrical device that generated the electrical signals sensed by the sensor.

2. A recognition device as defined in claim 1, wherein the sensor and controller are each attached to a wristband worn by the human user.

3. A recognition device as defined in claim 1, wherein the sensor is in contact with skin of the human user.

4. A recognition device as defined in claim 1, wherein the sensor is sufficiently close to the skin of the human user to be capacitively coupled thereto.

5. A recognition device as defined in claim 1, wherein the sensor and controller are each contained within a mobile electronic communication device carried or worn by the human user.

6. A recognition device as defined in claim 1, wherein the controller determines the geographic location of the recognition device and, based on the location, the controller uses the context of the location to assist in determining the type of electrical device that generated the electrical signals sensed by the sensor.

7. A recognition device as defined in claim 1, further including a user feedback device that provides information to the human user.

8. A recognition device as defined in claim 7, wherein the information is at least one of audio, visual, or haptic feedback to the user.

9. A recognition device as defined in claim 7, wherein the user feedback device provides information to the human user based on the type of electrical device that generated the electrical signals sensed by the sensor.

10. A recognition device as defined in claim 9, wherein the information provided to the human user relates to operation of the type of electrical device that generated the electrical signals sensed by the sensor.

11. A recognition device as defined in claim 1, wherein the controller includes a direct digital conversion receiver to receive RF electrical signals conducted by the body of the human user.

12. A recognition device as defined in claim 1, wherein the controller includes a software-defined radio to receive RF electrical signals conducted by the body of the human user.

13. A recognition device as defined in claim 1, wherein the electrical signals are a result of electromagnetic noise emitted by an electrical device in direct contact with the human user.

14. A recognition device as defined in claim 1, wherein the electrical signals are purposeful electromagnetic signals emitted by an electrical device.

15. A recognition device as defined in claim 13, wherein the device provides on-touch object detection.

16. A recognition device as defined in claim 1, wherein components of the device are a portion of a smart watch.

17. A recognition device as defined in claim 1, wherein the types of electrical devices include consumer electronic devices, home appliances, automobiles, power tools, devices with motors, solenoids and other electromechanical actuators, and large conductive objects that effectively serve as antennas.

18. A recognition device as defined in claim 1, wherein the types of electrical devices are free of a tag or sensor to communicate with the recognition device.

19. A recognition device as defined in claim 1, wherein the controller measures background noise present in the environment and adjusts the sensed electrical signals to remove the background environmental noise therefrom.

20. A recognition device as defined in claim 1, wherein the controller compares the electrical signals to the plurality of signatures only in a range below 1 MHz.

21. A method of recognizing objects touched or in proximity with a human user, the method comprising:
periodically measuring electromagnetic signals being conducted in the human user;
comparing the measured electromagnetic signals to a library of electromagnetic signal signatures, wherein each signature corresponds to a different type of electrical device, further including determining background electromagnetic signals and subtracting a value related to the background electromagnetic signals from the measured electromagnetic signals to provide background-adjusted measured electromagnetic signals to be used in the comparison;
based on the comparison, determining what type of electrical device the human user is in contact with; and
providing information to the human user based at least in part on the type of electrical device that the human user is in contact with.

22. A recognition device, comprising:
a sensor that senses electrical signals conducted by the body of the human user, wherein the electrical signals are a result of electromagnetic energy emitted by an electrical device in proximity to the human user;
a controller receptive of the electrical signals sensed by the sensor, the controller including a plurality of signatures for electrical signals produced by a corresponding plurality of types of electrical devices, the controller comparing the electrical signals sensed by the controller to the plurality of signatures to determine the type of electrical device that generated the electrical signals sensed by the sensor; and
a user feedback device that provides information to a human user based on the determined type of electrical device.

23. A recognition device carried or worn by a human user, the recognition device comprising:
a sensor that senses electrical signals conducted by the body of the human user; and
a controller receptive of the electrical signals sensed by the sensor, the controller including a plurality of signatures for electrical signals produced by a corresponding plurality of types of electrical devices, the controller comparing the electrical signals sensed by the controller to the plurality of signatures to determine the type of electrical device that generated the electrical signals sensed by the sensor, wherein the controller includes a receiver to receive RF electrical signals conducted by the body of the human user, wherein the receiver is selected from a group consisting of a direct digital conversion receiver and a software-defined radio.

* * * * *